(Model.)
J. C. TITUS.
DRILL HOLDING DEVICE.
No. 256,078. Patented Apr. 4, 1882.
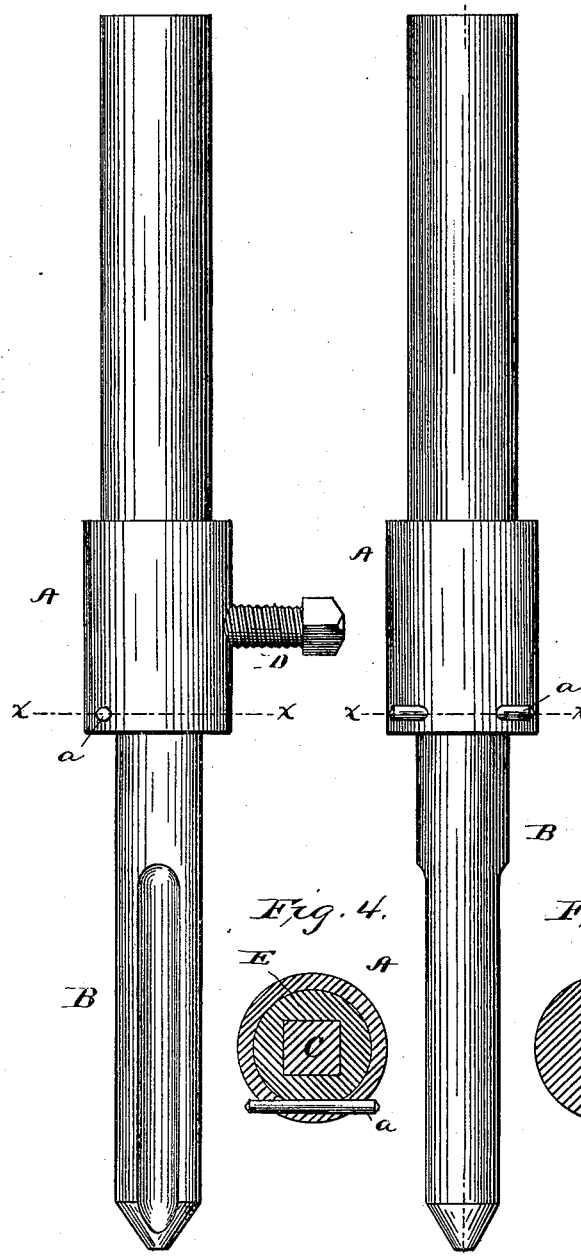
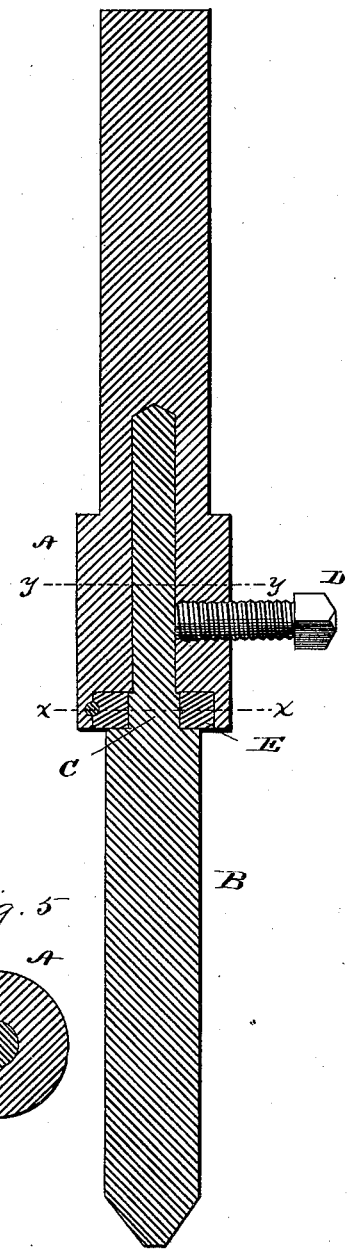
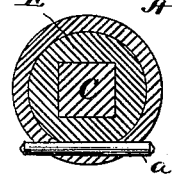
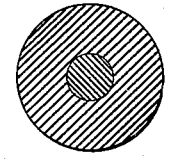
Witnesses,
Edwin L. Yewell.
H. Aubrey Toulmin
Inventor,
John C. Titus,
By C. M. Alexander,
his Atty.

UNITED STATES PATENT OFFICE.

JOHN C. TITUS, OF MARION, OHIO.

DRILL-HOLDING DEVICE.

SPECIFICATION forming part of Letters Patent No. 256,078, dated April 4, 1882.

Application filed December 12, 1881. (Model.)

*To all whom it may concern:*

Be it known that I, JOHN C. TITUS, of Marion, in the county of Marion, and in the State of Ohio, have invented certain new and useful Improvements in Drill-Spindles; and I do hereby declare that the following is a full, clear, and exact description thereof, reference being had to the accompanying drawings, and to the letters of reference marked thereon, making a part of this specification.

This invention relates to drill-spindles; and it consists in an improvement on the spindle or collet and shanks of drills used in drilling or boring machines, whereby the necessity of depending entirely on a set-screw or other like device to hold the drill or other tool firmly in place is obviated, as will be hereinafter explained.

In the annexed drawings, Figure 1 is a side view of a drill-stock and drill attached. Fig. 2 is a view of the same parts. Fig. 3 is a diametrical section. Fig. 4 is a cross-section taken in the plane $x\ x$. Fig. 5 is a cross-section taken in the plane $y\ y$.

I provide the end of the spindle-collet A as usually made for round shank-drills with a square socket of the necessary strength, and I provide the shank of the drill B with a corresponding square tenon, C, to accurately fit into the square hole formed in the spindle or driver. The spindle or collet is also provided with the usual set-screw, D, or other equivalent device, to retain the drill in its place, as shown in Fig. 3.

It is a very difficult matter to square a round hole part of its depth in the end of the spindle and get it exactly centered; so to remedy this difficulty, and at the same time to facilitate the fitting of the shanks of the drills, I prefer to counterbore the end of the spindle to a depth necessary to insure an accurately-fitting bushing, E, which is provided with a square hole through it to fit the corresponding square part of the shank of the drill, and is secured firmly to the spindle by a drilled pin-hole and a pin, $a$, passed partly through one side of the bushing E, as shown in Fig. 4.

By my invention it will be seen that I secure a round shank to accurately center the drill, and at the same time secure a square to drive it and to greatly strengthen the drill.

What I claim as my invention is—

The spindle-collet A, having a cylindrical hole in it to receive the round shank of the drill, and an enlarged hole to receive the driver or bushing E, in combination with this driver or bushing, the square centrally-arranged socket in this driver, and the square tenon C at the base of the drill-shank, substantially as described.

In testimony whereof I affix my signature, in presence of two witnesses, this 5th day of December, 1881.

JOHN C. TITUS.

Witnesses:
J. E. DAVIDS,
B. G. YOUNG.